(No Model.)
L. POSTAWKA.
SUPPORT FOR ADJUSTABLE AND REVOLVING SEATS.
No. 322,005. Patented July 14, 1885.
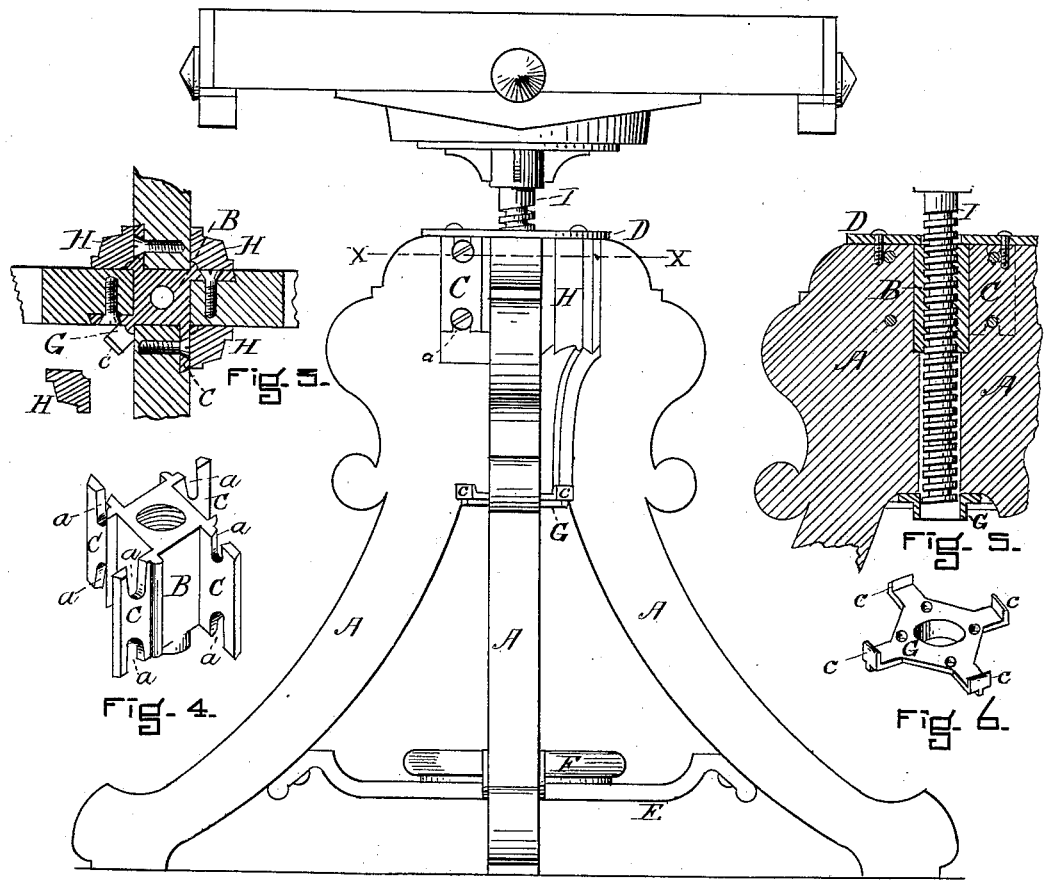
WITNESSES
R. L. Roberts.
Mary E. Woodburn.
INVENTOR.
Louis Postawka

UNITED STATES PATENT OFFICE.

LOUIS POSTAWKA, OF CAMBRIDGE, MASSACHUSETTS.

SUPPORT FOR ADJUSTABLE AND REVOLVING SEATS.

SPECIFICATION forming part of Letters Patent No. 322,005, dated July 14, 1885.

Application filed October 27, 1884. (No model.)

*To all whom it may concern:*

Be it known that I, LOUIS POSTAWKA, of Cambridge, in the county of Middlesex and Commonwealth of Massachusetts, have invented certain new and useful Improvements in Supports for Adjustable and Revolving Seats, of which the following is a specification.

This invention relates particularly to the means by which the legs of such supports are held together; and it consists of an improved nut or socket by which the legs are held together at the top where they converge, and of braces attached between the legs below their point of divergence to prevent them from spreading beyond their normal position.

Heretofore in chairs and stools having an adjustable or revolving seat and spreading legs which meet at the top the legs have been held together at the top by a metal plate secured in position by means of screws passing through the plate and down into the ends of the legs, and usually at the point of divergence of the legs by a metal plate having four prongs extending at right angles to each other, which was screwed to the legs on their under sides. In most instances the upper plate was cast in one piece with the nut or socket in which the adjusting-screw or swiveling rod worked; but in all seat-supports heretofore made the legs of which were held together by means of screws passing down into the upper ends of the wooden legs through a metal plate placed on top of them the legs would be very liable to split, which would leave the nut loose and thus render the seat unfit for use; and whenever the forked metal plates were employed on the under side of the legs it was a difficult matter to construct them so that each of the four prongs could be properly and accurately adjusted to the respective legs.

By means of my improved flanged nut or socket the legs of articles having an adjustable or revolving seat can be securely and durably attached together and without the liability of splitting the upper ends of the wooden legs, as with the old devices.

I construct my improved nut or socket preferably with flanges projecting from its sides in planes corresponding to the sides of the legs of the seat-support when the nut is placed in proper position between their upper ends, and by means of screws passing through holes or slots in these flanges I fasten them securely to the sides of the legs of the seat-supports. In order to have the flanges as strong and durable as possible, I make them as long as the nut or socket, and have them project in planes either radially to the axis of the screw or pivot working in the nut or socket, in which case a mortise must be cut in each leg to receive the flange, or they may be made to project in planes tangential to a cylindrical surface having the same axis as the said screw or pivot, in which case the flanges can be screwed upon the outside of the legs or in shallow grooves made deep enough to bring the surface of one side of each flange flush with the surface of the side of the corresponding leg. This latter position of the flanges I find preferable and the most convenient, and is the one which I have illustrated in the drawings.

For the purpose of giving such seat-supports a neat finish, and covering the flanges with the screw-heads in them, I place an ornamental piece of molding in the angle made by every two adjacent legs, and hold them in place by means of a bracket, (shown at Figure 6,) I fasten between the legs at their point of which divergence. On the edges of this bracket where it projects beyond the legs at the angles between them I form an upturned lip, so that when the lower ends of the corner-pieces are placed on this bracket the upturned lip will prevent their slipping out, and they can then be held in place by a short screw in the top through the cap-plate.

In the drawings forming a part of this specification, Fig. 1 is a side elevation of an adjustable seat provided with my improved flanged nut or socket and improved braces for the legs thereof. Fig. 2 is a plan view, looking at the bottom of the adjustable seat, showing the construction of my improved braces. Fig. 3 is a cross-section through the upper part of the seat-support, indicated by line *x x*, Fig. 1. Fig. 4 is a perspective view of my improved flanged nut or socket. Fig. 5 is a vertical section through the center of the upper part of the seat-support. Fig. 6 is a perspective view of the bracket used for holding the lower ends of the corner-pieces at the angles of the several legs of the seat-support.

The same letters indicate corresponding parts in the several figures.

A represents the legs of the seat-support; B, the flanged nut or socket; C, the flanges thereon, which are secured to the side of each leg by screws passing through slots or holes $a$ in the flanges. D is a cap-plate, which may be made separate or integral with the nut. E E' are the braces for the lower part of the legs, the slots $s\ s$, through which they are fastened together, being shown in Fig. 2. On the top of these braces, instead of using a nut, I place an ornamental piece of wood, F, and drive the screw into the center of it. G is the bracket which holds the lower ends of the corner-pieces H by means of the upturned lips $c$. I is the adjusting-screw.

This flanged nut or socket may be advantageously used with seat-supports having either three or four legs, and the wooden legs being fastened to the metal flanges upon one side only the evil effects produced by the alternate shrinking and swelling of the wood when held between two metal surfaces are obviated.

When making seat-supports having four legs, I further strengthen them by means of my improved braces, which, instead of being cast solid with four prongs, are made in two bars, E E', each having a slot, $s$, at the middle point of its length where the two cross one another when attached to the legs of the support below the point where they diverge. The two parts of the brace are then held firmly together by a screw passing through the opening left where the slots in each of the two bars cross, and secured by a nut or plate, F, on the opposite side.

In making such seat-supports with four legs it is difficult to join them at the top so accurately as to have the four legs at exactly equal distances apart where they spread toward their lower ends, and for that reason, as also on account of the irregular shrinking of the metal, there is no surety that a brace cast solid with four prongs can be adjusted between them in such a manner that each prong of the brace will accurately correspond with one of the legs, and consequently one or more of the prongs will be out of line with the leg to which it is intended to be fastened, and cannot be properly secured thereto, and, in addition, will give the seat-support an unsightly and unfinished appearance. By making such braces in two parts with a slot in the middle of each according to my improvement the difficulty is obviated, as will be readily seen by the drawings.

Another great advantage of my improved flanged nut and adjustable braces is that in their use no glue is required nor needed in fastening together the legs of seat-supports, and at the same time such supports can be readily taken apart to be packed for shipment and as readily put together again by any one capable of using a screw-driver.

It will be seen that, whether the geometrical position of the flanges by which the nut or socket is fastened to the seat-support is such that they are strictly radial to the axis of the nut or socket or are tangential to a cylinder whose axis is coincident with the axis of the nut or socket, they project from the nut or socket in planes substantially parallel to its axis or to the axis of the screw or pivot upon which the nut or socket works.

What I claim is—

1. In a support for adjustable and revolving seats, the combination of three or more legs secured at the top to a nut or socket by means of flanges projecting from its sides in planes parallel to the axis of the screw or pivot working in such nut or socket, and adjustable slotted braces E E', all constructed in the manner and for the purpose substantially as described.

2. In a support for an adjustable or revolving seat, the combination of three or more legs with a nut or socket having for each leg to be used a single flange projecting from the side of said nut or socket in a plane parallel to the axis of the screw or pivot working therein, and each of said flanges secured to its corresponding leg by fastenings passing through the flange and into the side of the leg, substantially as described and shown.

3. An adjustable brace for the legs of seat-supports made of two or more bars, each having a slot, $s$, across the middle point of its length, through which a bolt or screw may be inserted for the purpose of securing the bars together after they have been fastened to the legs of such supports.

LOUIS POSTAWKA.

Witnesses:
 MARY E. WOODBURN,
 R. L. ROBERTS.